US012527759B2

(12) United States Patent
Giorgetti

(10) Patent No.: US 12,527,759 B2
(45) Date of Patent: Jan. 20, 2026

(54) COMPOSITIONS COMPRISING AMINO ACIDS FOR USE AND TREATMENT OF CENTRAL NERVOUS SYSTEM INJURIES

(71) Applicant: Professional Dietetics S.p.A., Milan (IT)

(72) Inventor: Paolo Luca Maria Giorgetti, Milan (IT)

(73) Assignee: PROFESSIONAL DIETETICS S.P.A., Milan (IT)

( * ) Notice: Subject to any disclaimer, the term of this patent is extended or adjusted under 35 U.S.C. 154(b) by 716 days.

(21) Appl. No.: 17/430,240

(22) PCT Filed: Feb. 10, 2020

(86) PCT No.: PCT/IB2020/051027
§ 371 (c)(1),
(2) Date: Aug. 11, 2021

(87) PCT Pub. No.: WO2020/165731
PCT Pub. Date: Aug. 20, 2020

(65) Prior Publication Data
US 2022/0110899 A1    Apr. 14, 2022

(30) Foreign Application Priority Data
Feb. 13, 2019   (IT) .................. 102019000002109

(51) Int. Cl.
A61K 31/198    (2006.01)
A61K 31/194    (2006.01)
A61K 31/405    (2006.01)
A61K 31/4172   (2006.01)

(52) U.S. Cl.
CPC .......... A61K 31/198 (2013.01); A61K 31/194 (2013.01); A61K 31/405 (2013.01); A61K 31/4172 (2013.01)

(58) Field of Classification Search
CPC .. A61K 31/198; A61K 31/194; A61K 31/405; A61K 31/4172
See application file for complete search history.

(56) References Cited

U.S. PATENT DOCUMENTS

| | | | |
|---|---|---|---|
| 6,537,969 | B1 | 3/2003 | Blass |
| 7,982,066 | B2 | 7/2011 | Scheele |
| 9,597,367 | B2 | 3/2017 | Wolfe et al. |
| 10,226,441 | B2 | 3/2019 | Higashi et al. |
| 11,337,946 | B2 | 5/2022 | Giorgetti |
| 11,452,702 | B2 | 9/2022 | Giorgetti |
| 11,957,651 | B2 | 4/2024 | Giorgetti |
| 12,239,622 | B2 | 3/2025 | Giorgetti |
| 2003/0013761 | A1 | 1/2003 | Joshi |
| 2003/0055099 | A1 | 3/2003 | Martynyuk et al. |
| 2013/0084378 | A1 | 4/2013 | Jun et al. |
| 2013/0237605 | A1 | 9/2013 | Zemel |
| 2014/0243400 | A1 | 8/2014 | Mcgill |
| 2014/0315788 | A1 | 10/2014 | Wolfe |
| 2015/0335627 | A1 | 11/2015 | Yue et al. |
| 2016/0038565 | A1 | 2/2016 | Khan |
| 2018/0000764 | A1 | 1/2018 | Hernández Miramontes |
| 2020/0230093 | A1 | 7/2020 | Giorgetti |
| 2020/0253906 | A1 | 8/2020 | Giorgetti |
| 2021/0260011 | A1 | 8/2021 | Giorgetti |
| 2022/0110899 | A1 | 4/2022 | Giorgetti |
| 2022/0249418 | A1 | 8/2022 | Giorgetti |
| 2023/0067642 | A1 | 3/2023 | Giorgetti |
| 2023/0079527 | A1 | 3/2023 | Giorgetti |

FOREIGN PATENT DOCUMENTS

| | | | |
|---|---|---|---|
| CA | 2972889 A1 | 9/2016 | |
| CN | 105982914 A | 10/2016 | |
| EP | 2196203 A2 | 6/2010 | |
| EP | 2676664 A1 | 12/2013 | |
| EP | 2 881 112 | 6/2015 | |
| GB | 2029220 A | 3/1980 | |
| JP | H0873351 A | 3/1996 | |
| JP | 2007161642 A | 6/2007 | |
| JP | 6023813 B2 | 10/2016 | |
| WO | 2001051047 A1 | 7/2001 | |
| WO | 03/013487 A2 | 2/2003 | |
| WO | 2005034932 A2 | 4/2005 | |
| WO | 2006046746 A1 | 5/2006 | |
| WO | 2007049818 A1 | 5/2007 | |
| WO | 2012040707 A2 | 3/2012 | |
| WO | 2012147901 A1 | 11/2012 | |
| WO | 2016093104 A1 | 6/2016 | |
| WO | 2016116580 A1 | 7/2016 | |
| WO | 2016179657 A1 | 11/2016 | |
| WO | 2016181335 A1 | 11/2016 | |
| WO | 2017020121 A1 | 2/2017 | |
| WO | 2017089612 A1 | 6/2017 | |
| WO | 2018201024 A1 | 11/2018 | |
| WO | 2019/021135 | 1/2019 | |
| WO | WO-2019021137 A1 * | 1/2019 | ........... A61K 31/194 |
| WO | 2019070750 A1 | 4/2019 | |
| WO | 2019165321 A1 | 8/2019 | |
| WO | 2020003013 A1 | 1/2020 | |
| WO | 2022023932 A1 | 2/2022 | |
| WO | 2022266480 A1 | 12/2022 | |

OTHER PUBLICATIONS

Sullivan et al. (Journal of Neuroscience Research. 2005, 79:231-239). (Year: 2005).*
Pantuck et al. Anesth Analg. 1989; 69: 727-731 (Year: 1989).*
Bonfili et al. The FEBS Journal. 2017; 284: 1726-1737 (Year: 2017).*
S. Chiechio, et al., "L-Acetylcarnitine: A Proposed Therapeutic Agent for Painful Peripheral Neuropathies", Current Neuropharmacology, vol. 4, No. 3, Jul. 1, 2006, pp. 233-237 (5 pages).
International Search Report and Written Opinion of the ISA for PCT/IB2020/051027 dated Apr. 29, 2020, 11 pages.

(Continued)

Primary Examiner — Clinton A Brooks
Assistant Examiner — Jerica Katlynn Wilson
(74) Attorney, Agent, or Firm — Nixon & Vanderhye, PC

(57) ABSTRACT

Composition for use in the treatment of a central nervous system disease, the composition comprising an active agent, said active agent containing the amino acids leucine, isoleucine, valine, threonine, lysine and the carboxylic acids citric acid, succinic acid, malic acid.

20 Claims, 9 Drawing Sheets

(56) References Cited

OTHER PUBLICATIONS

Hall et al., "Lipid Peroxidation in Brain or Spinal Cord Mitochondria After Injury" J Bioenerg. Biomembr. Apr. 2016 ; 48(2): 169-174 (2017).
Keenan et al,, "Effects of carboxylic acids on the uptake of non-transferrin-bound iron by astrocytes, Neurochemistry International", 2010, 56: 843-849.
Abdullah, Chowdhury S. et al., "Doxorubicin-induced cardiomyopathy associated with inhibition of autophagic degradation process and defects in mitochondrial respiration", Scientific Reports, vol. 9, No. 1, Feb. 14, 2019, 20 pp.
Bournat, J.C., et al., Mitochondrial Dysfunction in Obesity Current Opinion Endocrinol Obesity, October, 17(5): 446-452, 2010.
Brocca et al., "Proteomic analysis of plasma after branched chain enriched mixture supplementation in mice", Journal of the International Society of Sports Nutrition, vol. 10, No. 1, Apr. 3, 2013, 5 pages.
Choudhury, Aaheli Roy et al., "Mitochondrial determinants of cancer health disparities", Seminars in Cancer Biology, 47, 2017, pp. 125-146.
Daher et al., J Clin Transl Hepatol. Mar. 28, 2018;6(1):69-78 (Year: 2018).
Damiani, Roberto Marques et al., "Pathways of cardiac toxicity: comparison between chemotherapeutic drugs doxorubicin and mitoxantrone", Archives of Toxicology, vol. 90, No. 9, Jun. 25, 2016, pp. 2063-2076.
Database WPI Week 200744, May 3, 2007, Thomson Scientific, London, GB, XP002788927, 3 pages.
Gilliam, Laura A.A. et al., "The anticancer agent doxorubicin disrupts mitochondrial energy metabolism and redox balance in skeletal muscle", Free Radical Biology and Medicine, vol. 65, Sep. 7, 2013, pp. 988-996.
Gorshinova et al., "Mitochondrial dysfunction as one of the mechanisms of impaired reproductive function in obesity." Akusherstvo i ginekologiya/Obstetrics and Gynecology. 2014; 7: 9-13. in Russian with English Abstract.
Hiensch, Anouk E. et al., "Doxorubicin-induced skeletal muscle atrophy: Elucidating the underlying molecular pathways", Acta Physiologica, vol. 229, No. 2, Oct. 10, 2019, 18 pp.
MP Biomedical—Technical Information—AIN-93-Diet,pp. 1-3 (Year: 2023).
Nakagaichi, M., et al., "Effects of Exercise Training Plus Vespa Amino Acid Mixture (VAAM) Ingestion in Obese Women," Japanese Journal of Health Promotion, 3, 11-16, 2001 with English Abstract.
Nakamura, E., et al., "Assessment of Biological Age by Principal Component Analysis," Mechanisms of Ageing and Development, vol. 46. Issues1-3, pp. 1-18, 1988.
Scholpa & Schnellmann, "Mitochondrial-Based Therapeutics for the Treatment of Spinal Cord Injury: Mitochondrial Biogenesis as a Potential Pharmacological Target." J Pharmacol Exp Ther 363:303-313, Dec. 2017.
Tapper et al., JAMA. 2023;329(18):1589-1602 (Year: 2023).
Tedesco et al., A specific amino acid formula prevents alcoholic liver disease in rodents, Am J Physiol Gastrointest Liver Physiol ., Epub Jan. 25, 2018, 314(5):G566-G582.
Wang et al., "Mitochondrial dysfunction in neurodegenerative diseases and the potential countermeasure," CNS Neurosci Ther. 25: 816-824 (2019).
Wang, X. et al., "Increases in mitochondrial biogenesis impair carcinogenesis at multiple levels" Molecular Oncology, Elsevier. Jul. 27, 2011., vol. 5, No. 5, pp. 399-409 (11 pages).
Beale et al., A Randomized Clinical Trial of High-Dosage Coenzyme Q10 in Early Parkinson Disease No Evidence of Benefit, JAMA Neurol., 71(5), pp. 543-552, 2014.
Brown et al., Mitochondrial function as a therapeutic target in heart failure, Nat Rev Cardiol., 14(4), pp. 238-250, 2017.
Fernández-Vizarra, et al., Tissue-specific differences in mitochondrial activity and biogenesis, Mitochondrion, vol. 11, pp. 207-213, 2011.
Keenan et al,, Effects of carboxylic acids on the uptake of non-transferrin-bound iron by astrocytes, Neurochemistry International, 56: 843-849, 2010.
Ma et al., Inhibition of AMP-Activated Protein Kinase Signaling Alleviates Impairments in Hippocampal Synaptic Plasticity Induced by Amyloid, The Journal of Neuroscience, 34(36), 12230-12238, Sep. 3, 2014.
Rao et al., Mitochondrial permeability transition pore is a potential drug target for neurodegeneration, Biochimica et Biophysica Acta, 1267-1272, 2014.
Sbodio et al., Redox Mechanisms in Neurodegeneration: From Disease Outcomes to Therapeutic Opportunities, Antioxidants & Redox Signaling, vol. 30, No. 11, pp. 1450-1499, 2019.
Short et al., Decline in skeletal muscle mitochondrial function with aging in humans, PNAS, vol. 102, No. 15, pp. 5618-5623, Apr. 12, 2005.
Sun et al., The Mitochondrial Basis of Aging, Mol Cell., 61(5), pp. 654-666, Mar. 3, 2016.
Vingtdeux et al., AMPK is abnormally activated in tangle- and pre-tangle-bearing neurons in Alzheimer's disease and other tauopathies, Acta Neuropathol, vol. 121, pp. 337-349, 2010.
Westermann et al., Mitochondrial fusion and fission in cell life and death, Molecular Cell Biology, vol. 11, 13 pages, Dec. 2010.
Youle et al., Mitochondrial Fission, Fusion, and Stress, Science, 337(6098), pp. 1062-1065, Aug. 31, 2012.
U.S. Appl. No. 18/878,129, filed Dec. 23, 2024 in related application.
Kalyanaraman, "Teaching the basics of the mechanism of doxorubicin-induced cardiotoxicity: Have we been barking up the wrong tree?" Redox Biology, 29: 101394 (2020).
Nergiz et al.; "Organic acid content and composition of the olive fruits during ripening and its relationship with oil and sugar"; 2009; Scientia Horticulturae; 122: 216-220 (Year: 2009).
Green et al. (Biochmica et Biophysica Acta 1588 (2002) 94-101 (Year: 2002).
International Search Report and Written Opinion of the ISA for PCT/IB2023/055818, mailed Sep. 20, 2023, 16 pages.
Liu, Yulan et al., "Roles of amino acids in preventing and treating intestinal diseases: recent studies with pig models", Amino Acids, vol. 49, No. 8, Jun. 14, 2017, pp. 1277-1291.
Mao, Xiangbing et al, "l-Isoleucine Administration Alleviates DSS-Induced Colitis by Regulating TLR4/MyD88/NF-κB Pathway in Rats", Frontiers in Immunology, vol. 12, Article 817583, Jan. 11, 2022, 12 pages.
Sprong et al., "Dietary cheese whey protein protects rats against mild dextran sulfate sodium-induced colitis: Role of mucin and microbiota", Journal of Dairy Science, vol. 93, No. 4, Apr. 1, 2010, pp. 1364-1371.
Kim, Yun-Gi et al., "Neonatal acquisition of *Clostridia* species protects against colonization by bacterial pathogens", Science, vol. 356, No. 6335, Apr. 21, 2017, pp. 14 pages.
Anonymous: "Amino acid-derived therapy for Inflammatory bowel disease: L-Leucine, the branched chain amino acid, promotes NFKB-p50/p65 dimer formation, induces inflammatory gene expression downstream of RelA/p65, inhibits colonic pathogenesis, and stalls the progression of inflammatory bowel disease and colitis", May 16, 2017, XP093023862, 5 pages, retrieved from the Internet: URL: https://genomediscovery.org/natural-product-derived-therapy-for-inflammatory-bowel-disease-1-leucine-the-branched-chain-amino-acid-promotes-nfkb-p50p65-dimer-formation-induces-inflammatory-gene-expression-downstream-of-rel/.
Ashida, Toshifumi et al., "Effect of Oral Administration of Isoleucine, Stimulant of Innate Immunity, in IBD Patients", Gastroenterology, vol. 26, No. 4, Suppl 2, Apr. 1, 2004, 1 page, XP093023803, retrieved from the Internet: URL:https : //www.gastrojournal.org/issue/S0016-5085(00)X0347-2.

* cited by examiner

COMPOSITIONS COMPRISING AMINO ACIDS FOR USE AND TREATMENT OF CENTRAL NERVOUS SYSTEM INJURIES

This application is the U.S. national phase of International Application No. PCT/IB2020/051027 filed Feb. 10, 2020 which designated the U.S. and claims priority to IT patent application No. 102019000002109 filed Feb. 13, 2019, the entire contents of each of which are hereby incorporated by reference.

FIELD OF THE INVENTION

The present description relates generally to compositions comprising amino acids. More particularly, the description relates to compositions comprising amino acids for use in the treatment of central nervous system injuries in a subject.

BACKGROUND

The central nervous system (CNS) comprises the brain, coordinating higher-level functions, and the spinal cord serving mainly as the communication pathway between the brain and the periphery. Disabilities from central nervous system's injuries are a function of the mode, severity, and anatomical location of the insult. Regardless of the initial location of the insult to the CNS, injury is an ongoing process, with primary damage leading to a cascade of deleterious events that can affect both cell body and axonal function, resulting in continued dysfunction and prolonged degeneration.

Traumatic brain injury (TBI) and traumatic spinal cord injury (SCI) occur when an external physical insult causes damage and can range from mild to severe. Spinal cord injury is cause of disability with devastating neurological outcomes and limited therapeutic opportunities. There are two major types of spinal cord injury (SCI), transection of the spinal cord and spinal cord contusion. SCI results in partial or complete loss of motor or sensory functions below the level of the injury, with devastating consequences for the patient both at the physical and psychological level. The pathological basis underling the diseases is the loss of neural tissue that disconnects the neuronal impulses from the central nervous system to the muscles. Worldwide approximately 250,000-500,000 people suffer an injury to the spinal cord every year (corresponding to 30-60 people every hour). These patients require extensive medical assistance throughout their life, with an estimated lifetime cost of 1-4 million euros per patient. Although SCI represent an important social and economic burden, few new therapeutic options are available. In the last 30 years, progress in medical assistance has increased the survival rate of SCI patients. Basic and translational research, however, did not succeed in substantial improving the neurological outcome.

SUMMARY OF THE INVENTION

The present description provides amino acid-based compositions particularly effective in the treatment of central nervous system injuries in a subject.

According to the present description, the above object is achieved thanks to the subject matter specifically recalled in the ensuing claims, which are understood as forming an integral part of this disclosure.

An embodiment of the present description provides a composition for use in the treatment of a central nervous system injury in a subject, the composition comprising an active agent, said active agent containing the amino acids leucine, isoleucine, valine, threonine, lysine and the carboxylic acids citric acid, succinic acid, malic acid.

In one or more embodiments, the active agent of the composition further contains one or more amino acids selected in the group consisting of histidine, phenylalanine, methionine, tryptophan, cysteine and tyrosine.

In a preferred embodiment, the central nervous system injury is selected in the group consisting of cerebral injury, spinal cord injury, peripheral nerve injury, demyelinating disease. In one or more embodiments, the spinal cord injury comprises contusive spinal cord injury.

A further embodiment of the present disclosure provides a method of treating central nervous system injuries in a subject, the method comprising selecting a composition comprising an active agent, said active agent containing the amino acids leucine, isoleucine, valine, threonine, lysine, and the carboxylic acids citric acid, succinic acid, and malic acid, and administering the composition in order to treat the central nervous system injuries.

BRIEF DESCRIPTION OF THE DRAWINGS

The invention will now be described, by way of example only, with reference to the enclosed figures, wherein.

DETAILED DESCRIPTION OF PREFERRED EMBODIMENTS

Figure 1:
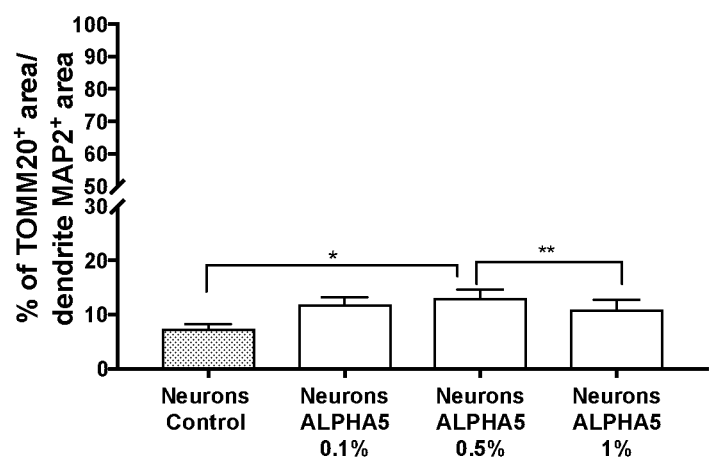
FIG. 1 shows a quantification of mitochondrial area in differentiating NSCs in vitro supplemented with a composition according to embodiments of the instant disclosure. Data are presented as mean±SEM. *=$p<0.05$; **=$p<0.01$.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

The Inventor of the instant application surprisingly found that by adding specific carboxylic acids in specific amounts to a composition comprising a combination of leucine, isoleucine, valine, threonine and lysine a high effectiveness in favoring and increasing oxidative metabolism in differentiating neuronal cells occurred.

Feature of differentiated mature neurons is the switch from glycolysis to a more oxidative metabolism (Zheng et al., 2016). In order to investigate whether the supplementation of the composition herein disclosed could enhance this metabolic switch (pro-oxidative metabolism) and promote neuronal differentiation, the effect of the composition supplementation on differentiating sub-ventricular zone (SVZ)-derived NSCs was analyzed. In addition, to further investigate whether the composition herein disclosed affects the neuronal cell differentiation and maturation in NSCs from other origin, the analysis was expanded on neurogenic Radial-Glia Like Cells present in meninges (Bifari et al., 2017c).

Meningeal NSCs and SVZ-derived NSCs were isolated as previously described (Bifari et al., 2017) and sorted for the expression of the markers PDGFRβ and CD133/Prominin-1, respectively.

After culturing, meningeal-NSCs and SVZ-derived-NSCs were expanded as neurospheres and differentiated into neurons by changing media conditions (Bifari et al., 2009). The media were supplemented with increasing concentration of the composition according to embodiments of the instant application, starting from 0.1%, to 0.5% and 1%.

The composition according to embodiments of the instant application has been shown to enhance the neuronal maturation in vitro, as disclosed in the "Result section".

In addition, following the very promising and surprising results obtained in vitro, the Inventor also tested the effect of the composition administration on a preclinical animal model of complete (severe) contusive spinal cord injury (SCI).

SCI results in partial or complete loss of motor or sensory functions below the level of the injury, with devastating consequences for the patient both at the physical and psychological level.

The composition herein disclosed—comprising as active agent the amino acids leucine, isoleucine, valine, threonine, lysine in combination with three carboxylic acids, which are substrates of tricarboxylic acid cycle, including citric acid, succinic acid, and malic acid in specific amounts—has been shown to be very effective in counteracting the neural tissue loss and favouring the neuronal regeneration after complete contusive SCI, i.e. an injury that has no spontaneous recovery and mostly reflect the condition observed in humans.

The compositions herein disclosed are significantly more effective than a similar amino acid composition free of such specific carboxylic acids.

In one or more embodiments, in the composition herein disclosed the weight ratio between the total amount of citric acid, succinic acid and malic acid and the total amount of the amino acids leucine, isoleucine, valine, threonine, lysine is comprised between 0.05 and 0.3, preferably between 0.1 and 0.25.

In one or more embodiments, the active agent may further comprise one or more amino acids selected in the group consisting of histidine, phenylalanine, methionine, tryptophan, cysteine, and tyrosine.

In one or more embodiments, the carboxylic acids contained in the composition may consist of citric acid, succinic acid, and malic acid.

In a further embodiment, the active agent of the composition herein disclosed may also include aspartic acid and/or ornithine L-alphaketoglutarate (OKG).

According to an embodiment, the composition comprises an active agent, the active agent consisting of leucine, isoleucine, valine, threonine, lysine, histidine, phenylalanine, methionine, tryptophan, cysteine, and optionally tyrosine, as well as citric acid, succinic acid, and malic acid, said amino acids being the sole amino acids contained in the composition. Citric acid, succinic acid, and malic acid may be the sole carboxylic acids contained in the composition.

In a further embodiment, the composition may comprise the amino acids isoleucine, leucine, and valine in an amount between 35% and 65% by weight, preferably between 42% and 56% by weight, with respect to the active agent weight.

In one or more embodiments, the weight ratio between leucine and citric acid is comprised between 5 and 1, preferably between 2.50 and 3.50.

In a further embodiment, the weight or molar amount of citric acid is higher than the weight or molar amount of each of malic acid and succinic acid. Preferably, the weight or molar amount of citric acid is higher than the weight or molar overall amount of malic acid plus succinic acid. In a further embodiment, the weight ratio between citric acid and the sum of malic acid and succinic acid is comprised between 1.0 and 4.0, preferably between 1.5 and 2.5. In a preferred embodiment, the citric acid:malic acid:succinic acid weight ratio is comprised between 10:1:1 and 2:1.5:1.5, preferably between 7:1:1 and 1.5:1:1, more preferably between 5:1:1 and 3:1:1. In a preferred embodiment the citric acid:malic acid:succinic acid weight ratio is 4:1:1.

According to some embodiments of the present disclosure, the preferred isoleucine:leucine molar ratio is comprised in the range 0.2-0.7, preferably in the range 0.30-0.60 and/or the preferred valine:leucine weight ratio is comprised in the range 0.2-0.70, preferably in the range 0.30-0.65.

In a further embodiment, the threonine:leucine molar ratio is comprised in the range of 0.10-0.90, preferably in the range 0.20-0.70 and/or the lysine:leucine weight ratio is comprised in the range of 0.20-1.00, preferably in the range 0.40-0.90.

In a preferred embodiment, the ratio between the overall molar amount of citric acid, malic acid, succinic acid and the overall molar amount of methionine, phenylalanine, histidine and tryptophan is higher than 1.35.

In one or more embodiments, the weight ratio between the sum of citric acid, malic acid, succinic acid and the sum of the branched chain amino acids leucine, isoleucine, valine is comprised between 0.1 and 0.4, preferably between 0.15 and 0.35.

In a further embodiment, the overall weight amount of the branched-chain amino acids leucine, isoleucine, valine plus threonine and lysine is higher than the overall weight amount of three carboxylic acids, such as citric acid, malic acid, and succinic acid. Preferably, the weight amount of the single carboxylic acid (citric acid, succinic acid, or malic acid) is less than the weight amount of each of the single amino acids leucine, isoleucine, valine, threonine, and lysine.

In a further embodiment, the overall molar amount of lysine and threonine is higher than the overall molar amount of the three carboxylic acids citric acid, succinic acid, malic acid. Preferably, the ratio between the overall molar amount of the three carboxylic acids citric acid, succinic acid, malic acid and the overall molar amount of lysine and threonine is comprised between 0.1 and 0.7, preferably between 0.15 and 0.55.

In one or more embodiments, the composition herein disclosed further comprises vitamins, preferably selected in the group of vitamins B, such as vitamin $B_1$ and/or vitamin $B_6$. In a further embodiment of the present disclosure, the composition may include carbohydrates, additives and/or flavoring substances.

In one or more embodiment, the compositions herein disclosed are intended for use in the treatment of central nervous system injuries preferably selected in the group consisting of cerebral injury, spinal cord injury, peripheral nerve injury, demyelinating disease. The spinal cord injury may comprise contusive spinal cord injury.

When preparing the compositions according to the instant disclosure, and specifically the active agent, the amino acid arginine is preferably avoided. In addition, further amino acids preferably avoided by the composition herein disclosed may be serine, proline, alanine. Such amino acids can be counterproductive or even harmful in some concentrations or stoichiometric ratios within the composition.

The amino acids disclosed in the instant application can be replaced by respective pharmaceutically acceptable derivatives, namely salts.

According to a further embodiment, the amino acid compositions may comprise pharmaceutically acceptable excipients, like for example proteins, vitamins, carbohydrates, natural and artificial sweeteners and/or flavouring substances. In a preferred embodiment, the pharmaceutically acceptable excipients may be selected from whey proteins, maltodextrins, fructose, calcium caseinate, fish oil, sucralose, sucrose esters, vitamin D3, group B vitamins.

For oral use, the compositions according to the description may be in the form of tablets, capsules, granules, gel, gelable powder, or powder.

The composition herein disclosed may be administered in a subject in dosage/day of active agent ranging from 8.0 g to 24.0 g.

The disclosure also provides a method of treating central nervous system injuries in a subject, the method comprising selecting a composition comprising an active agent, said active agent containing the amino acids leucine, isoleucine, valine, threonine, lysine, and the carboxylic acids citric acid, succinic acid, and malic acid, and administering the composition in order to treat the central nervous system injuries.

Further specifications, in terms of amounts and ratios among the various amino acids provided for by the compositions are contained in the attached claims, which form an integral part of the technical teaching provided herein in relation to the invention.

Examples

Table 1 shows the amino acid-based composition named "alpha 5m (α5m)" tested in vitro and in vivo.

TABLE 1

| Composition (% w/w) | α5m |
|---|---|
| L-Leucine | 31.0885 |
| L-Lysine HCl chlorhydrate | 16.903 |
| L-Isoleucine | 10.3628 |
| L-Valine | 10.3628 |
| L-Threonine | 7.254 |
| L-Cysteine | 3.1089 |
| L-Histidine | 3.1089 |
| L-Phenylalanine | 2.0726 |
| L-Methionine | 1.0363 |
| L-Tyrosine | 0.6218 |
| L-Tryptophan | 2.0726 |
| Vitamin B1 (thiamine chlorhydrate) | 0.004 |
| Vitamin B6 (piridoxine chlorhydrate) | 0.0038 |
| Citric acid anhydrous | 8.0000 |
| Malic acid | 2.0000 |
| Acid L-aspartic | — |
| Succinic acid | 2.0000 |
| Ratio Leucine:Isoleucine:Valine | 3:1:1 |

The α5m composition may be prepared first by sifting all the components with a 0.8 mesh. To obtain a pre-mixture, each ingredient (in an amount <10% by weight of the total amount) is put in a polyethylene bag together with a portion of L-lysine HCl so as to obtain 10% of the weight of the total composition. The bag is then manually shaken for 5 minutes. The pre-mixture is then loaded in a mixer (Planetaria) together with the remainder of the ingredients and mixed for a period of 15 minutes at 120 rpm to obtain a homogeneous final composition.

Methods

Cell Culture and Treatments

Cell cultures of meningeal NSCs, sub ventricular zone (SVZ)-derived NSCs, (men-Neurons and SVZ-Neurons) were supplemented with α5m composition (α5m). α5m was added to the specific culture medium (0.1%, 0.5%, 1%), then medium pH was adjusted at 7.4 and filtered before being added to the different cell cultures. α5m was changed every 2-3 days and supplemented up to maturation of the men-Neurons and SVZ-Neurons at 10 days in vitro (DIV).

Cell Culture Immunofluorescence

First, cells were plated onto poly-D-lysine coated glass slides. After a fixation step in 4% paraformaldehyde (PFA, Sigma-Aldrich), aspecific binding sites were blocked by incubation in blocking solution (3% fetal bovine serum, 1% bovine serum albumin, 0.3% Triton X-100 in PBS 1×). Subsequently, cells were incubated in primary antibody solution (specific primary antibodies in blocking solution) for 1.5 h at room temperature, washed twice with blocking solution and incubated in the specific secondary antibody solution (specific secondary antibodies in blocking solution) for 1 h. Following three washes in blocking solution, slides were incubated with the nuclear dye TO-PRO3 (Thermo Fisher Scientific) for 10 minutes and mounted on glass microscope slides for confocal microscope quantification (Zeiss LSM 710 confocal microscope). Primary antibody: Microtubule-associated protein 2 (MAP2 rabbit, Sigma, 1:200) to label mature neurons, TOMM20 (mouse, 1:200, Abcam) to label mitochondria. The following secondary antibodies were used: donkey anti-rabbit Alexa Fluor 546 (Molecular Probes, 1:500), goat anti-rabbit Alexa Fluor 488 (Molecular Probes, 1:500).

Animals and Surgical Procedures

Experimental protocols were approved and conducted in accordance with the European Community Council Directive of Nov. 24, 1986 (86/609/EEC), and the Italian Ministry of Heath, and complied with The National Animal Protection Guidelines.

Adult female C57BL/6J (7 weeks old) mice were exposed to laminectomy and the contusive injury (SCI) was performed at vertebrate thoracic level 11 (T11). Three different experiments with 18, 20 and 12 animals respectively were performed.

Figure 5:
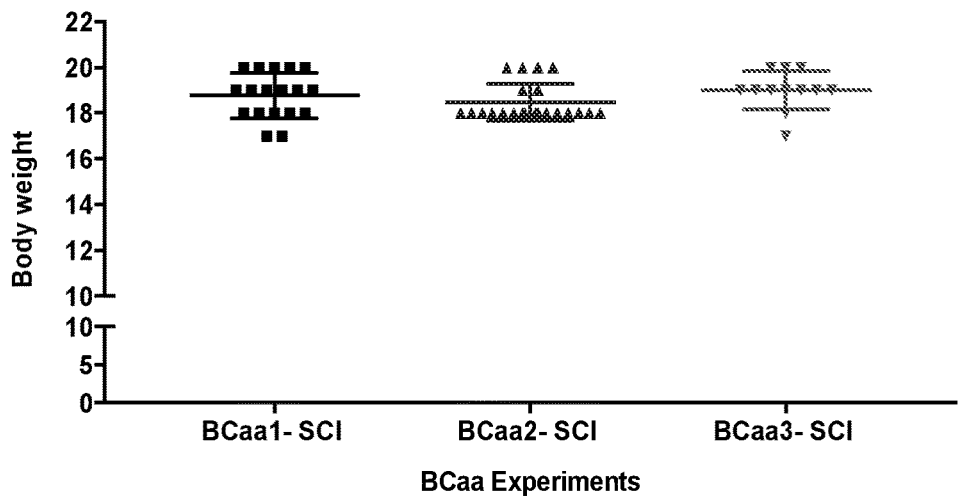
FIG. 5 shows the weights of the animals at the time of surgery in three different set of experiments (BCaa1-SCI, BCaa2-SCI, BCaa3-SCI). Data are shown as mean±SEM. SCI=spinal cord injury.

Before performing every SCI surgery, all animals were weighed and only mice that weigh in a range of 16-21 gr were considered for the experiments. Weights of animals at the time of the surgery are shown in FIG. 5.

The procedure of severe SCI, due to the severity of the performed surgeries or to complication during the recovery period caused the death of 1 animal out of 50.

Animals were housed separately in clean polypropylene cages and divided into 2 groups: 1) control-fed group (CTRL, n=22); 2) α5m-fed group (α5m, n=25), i.e. the group of animals fed with the amino acid composition shown in Table 1.

Locomotor Evaluation

In order to evaluate the effects of the α5m supplementation on the motor functional recovery after a severe SCI, the Basso Mouse Scale (BMS) analysis was performed (Basso et al., 2006). The locomotor performance of each mouse was assessed at 1, 3, 5, 7 dpi during the first week after the SCI surgery and twice a week (10, 14, 17, 21, 28, 31 dpi) till the end of the experiment (31 dpi), when mice were perfused and spinal cords were dissected. Only mice that show a BMS score of "0" at 1 dpi were included in the analysis, mice with higher BMS score were excluded from the study.

Ankle Movement Analysis

This parameter allows to determine if the treatment applied shows a beneficial effect avoiding the instauration of a spastic condition of the muscles related to the ankle joint movement. In this analysis, a score to the movement of both the left and right ankle joint was assigned accordantly to the quality of their movement: "0" corresponds to no movement (spastic condition) "0.5" to a not complete movement, and "1" to a normal movement.

Bladder Functionality Evaluation

The diuresis of the animals was analysed starting from 1 dpi till the end of the experiment. Bladders were emptied manually and the urine was collected and weighed twice a day till 5 dpi and then once a day till the end of the experiment.

Tissue Histology and Immunohistochemical Analysis

Spinal Cord Fixation and Processing

Animals were anesthetised with intraperitoneal injection of chloral hydrate (2,2,2-Trichloroethane-1,1-diol, 2 ml/kg) and intracardially perfused with saline solution (0.9% NaCl) followed by 4% paraformaldheyde (PFA, Sigma-Aldrich) added with 4% sucrose in PBS 1×. Spinal cords were extracted and post-fixed overnight in 4% PFA/4% sucrose. Then they were stored in 30% sucrose solution at 4° C. to cryoprotect the tissues. For histochemical analysis, 1.5 cm of dissected spinal cords (0.75 cm rostral and 0.75 cm caudal from the lesion site) cord were embedded with Optimal Cutting Temperature compound (OCT) and criosectioned (25 μm-thick transverse sections or 20 μm-thick longitudinal sections). The obtained sections were stored at −20° C. and analysed with histological and immunohistochemical methods.

Figure 13:
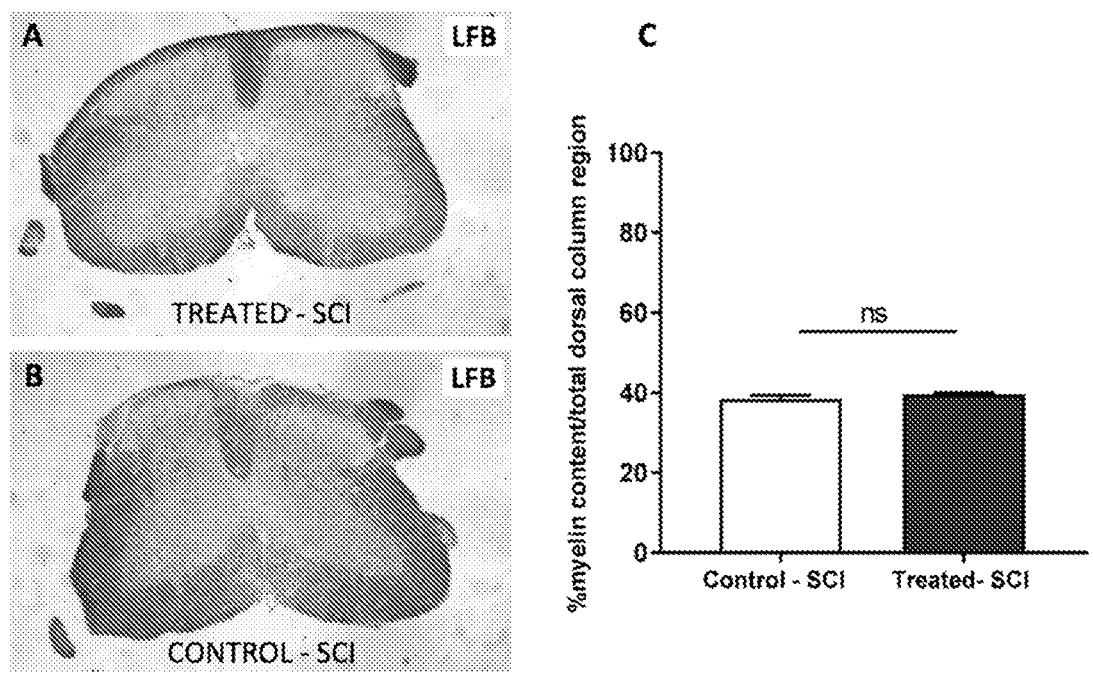
FIG. 13: in panel A and B spinal cord transversal slices stained with Luxol Fast Blue (LFB) of a treated and a control mouse respectively. LFB allows the identification of the myelin content in the spinal cord parenchyma, from the demyelinated area (white area). C) The graph represents the percentage of the myelin content in the dorsal column of the spinal cord sections of treated- and control-mice calculated as myelin positive pixels in the dorsal column among the pixels of the total area of the dorsal column. Data are shown as mean±SEM; n=3 animals and 8 slices/animals were analysed for each group. ns=not significant. SCI=spinal cord injury.

Luxol Fast Blue Staining (FIG. 13)

Myelin content was quantified in the tissue sections via Luxol Fast Blue (LFB) staining. First, 0.1% LFB solution was prepared solubilizing LFB (Sigma-Aldrich) in 95% ethanol (EtOH, Carlo Erba) and 1.22% glacial acetic acid (Carlo Erba). Then, sections were hydrated in EtOH solutions (100%, 95%, 70% and 50%) and stained with 0.1% LFB solution at 40° C. for 40 minutes. They were then rinsed with tap water and differentiated in 0.05% Li2CO3 solution (Sigma-Aldrich), dehydrated in EtOH solutions (50%, 70%, 95% and 100%), cleared in xylene (Carlo Erba) and mounted with Entellan (Merck-Millipore) for light microscopy analysis of myelin content (Zeiss Axioscop2).

Spinal Cord Tissue Analysis

Figure 11:
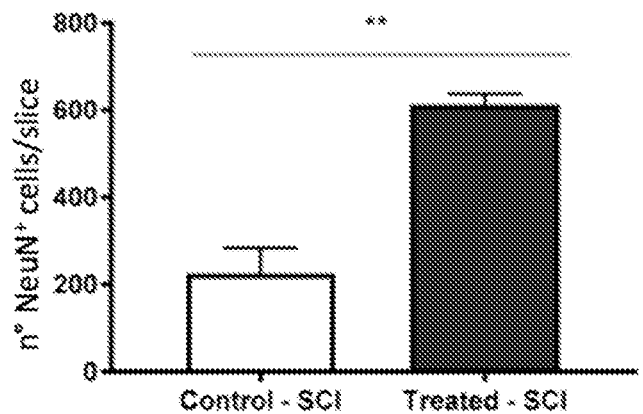
FIG. 11 shows a graph representing the number of NeuN-positive cells in the spinal cord of treated and control animals in the perilesioned area. Data are shown as mean±SEM; n=3 animals and 8 slices/animals were analysed for each group. **P<0.01.

Cryosections were thawed, washed with PBS 1× and incubated for 30 minutes in blocking solution (0.25% Triton X-100, 2% bovine serum albumin in PBS 1×) in order to block aspecific binding sites. Slides were then incubated in primary antibodies solution (specific primary antibodies in blocking solution) overnight at 4° C. After rinsing 6 times for 5 minutes in blocking solution, slides were incubated in the specific secondary antibody solution (specific secondary antibodies in blocking solution) for 4 hours at room temperature. Following three washes in blocking solution and three in PBS 1×, slides were incubated with the nuclear dye TO-PRO3 (Thermo Fisher Scientific) or 4'.6-Diamidino-2-Phenylindole (DAPI, Thermo Fisher Scientific, 1:2000) for 10 minutes and mounted using 1.4-Diazabicyclo (2.2.2) octane (DABCO, Sigma-Aldrich) on for microscope quantification (Zeiss LSM 710 confocal microscope). Primary antibodies used: Glial Fibrillary Acidic Protein (GFAP goat, 1:200, Abcam) to label astrocytes (FIG. 9), Neurofilament-200 (NF200 rabbit, 1:200, Sigma) to label neurofilament protein 200 KDa of the neuronal cytoskeleton (FIG. 12), NeuN (NeuN mouse, Chemicon, 1:200) to label neurons (FIG. 11). Secondary antibody used: donkey anti-rabbit Alexa Fluor 546 (Molecular Probes, 1:500), goat anti-rabbit Alexa Fluor 488 (Molecular Probes, 1:500), donkey anti-mouse Alexa Fluor 488 (Molecular Probes, 1:500), goat anti-mouse CY3 (Amersham, 1:500), donkey anti-goat Alexa Flour 488 (Life-technologies, 1:500).

Results

In Vitro Analysis

Mitochondrial Content in Differentiating NSCs In Vitro

By immunofluorescence and confocal analysis, the area covered by the mitochondrial marker TOMM20 in MAP2 positive neuronal cells was evaluated.

Graph in FIG. 1 shows the quantification of mitochondrial area (i.e. TOMM20+ area) per MAP2+ dendrite in differentiating neurons showing that α5m supplementation is capable of increasing the mitochondrial content at a 0.5% concentration.

Oxidative Metabolism in Differentiating NSCs In Vitro

The oxidative metabolism of NSC differentiating cells was evaluated by analysing the oxygen consumption rate (OCR) of control and α5m-treated (0.5% concentration) men-Neurons and SVZ-Neurons using the Seahorse technology.

Figure 2:
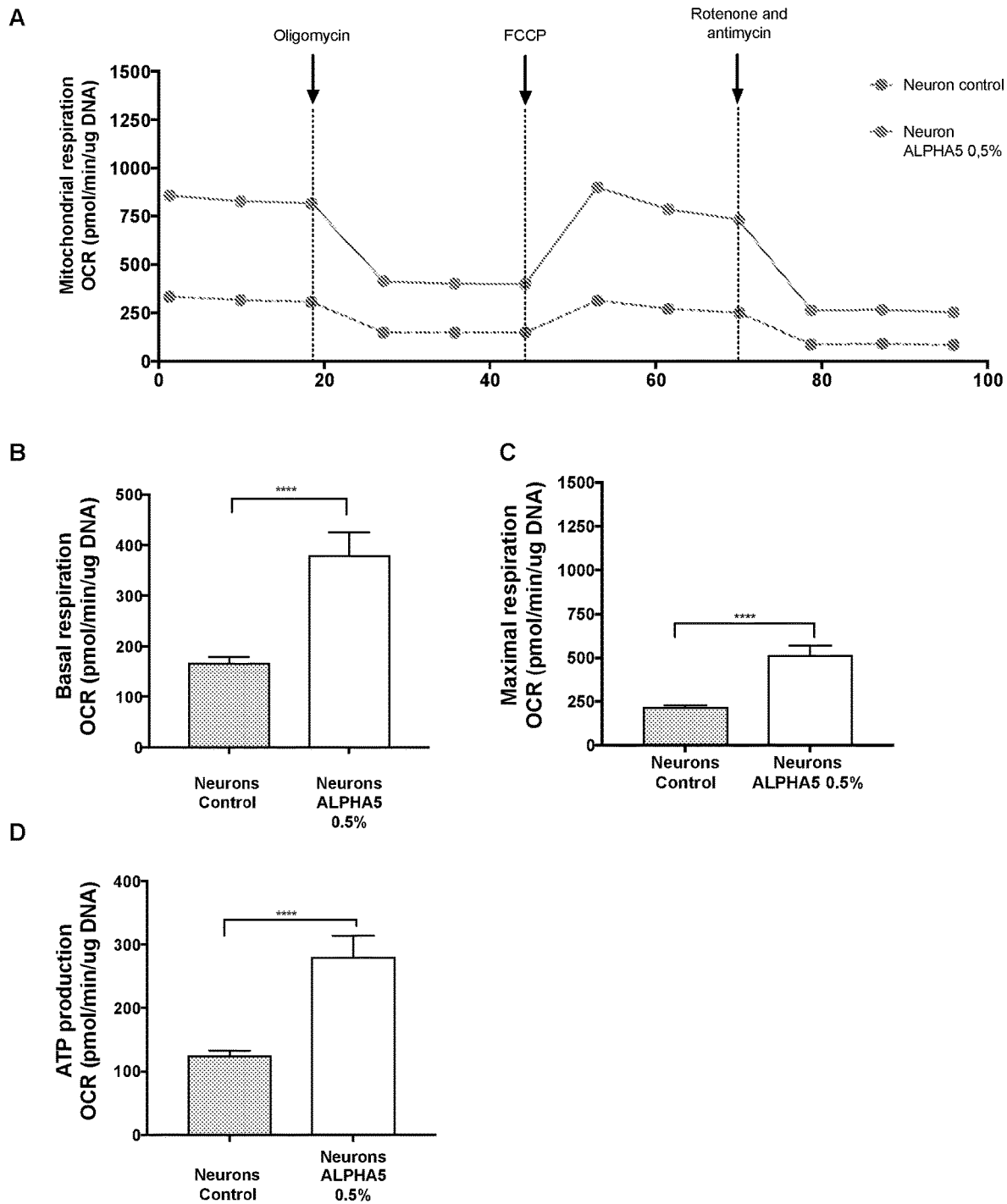
FIG. 2 shows a quantification of the oxidative metabolism in differentiating NSCs in vitro supplemented with a composition according to embodiments of the instant disclosure. The Seahorse extracellular flux analyzer allows the measurement of different bioenergetics parameters by sequential injection of different inhibitors of the mitochondrial electron transport chain. Rotenone and Antimycin-A injection allows the calculation of non-mitochondrial OCR and the baseline mitochondrial respiration. Oligomycin injection allows measuring of respiration coupled to ATP synthesis and maximal respiration is induced by the uncoupler FCCP. Data are presented as mean±SEM. =$p<0.01$; *=$p<0.001$; ****=$p<0.0001$.

A statistically significant increase in the OCR was observed in differentiating neurons supplemented with the α5m composition (FIG. 2A) and, accordingly, an increase of the basal and maximal respiration as shown in FIG. 2B and C.

Of note ATP production was doubled (men-Neurons: from 125.1 to 280.1 pmol/min/ug, FIG. 2D; SVZ-Neurons: from 156.1 to 523.0 pmol/min/ug) indicating higher energy disposal.

In line with the previous results, therefore, an increase in mitochondrial functionality was observed for the cells supplemented with the composition of the instant application.

Dendritic Arborization of NSC Differentiating Cells

Men-Neurons and SVZ-Neurons showed an increase in oxidative metabolism and mitochondrial activity after α5m supplementation. To compare the meningeal- and SVZ-derived-NSC neural maturation in control and supplemented conditions, neurospheres were induced to differentiate into neurons and the morphological changes were analysed by immunofluorescence and confocal analysis for the neuronal marker MAP2, at 10 DIV.

Figure 3:
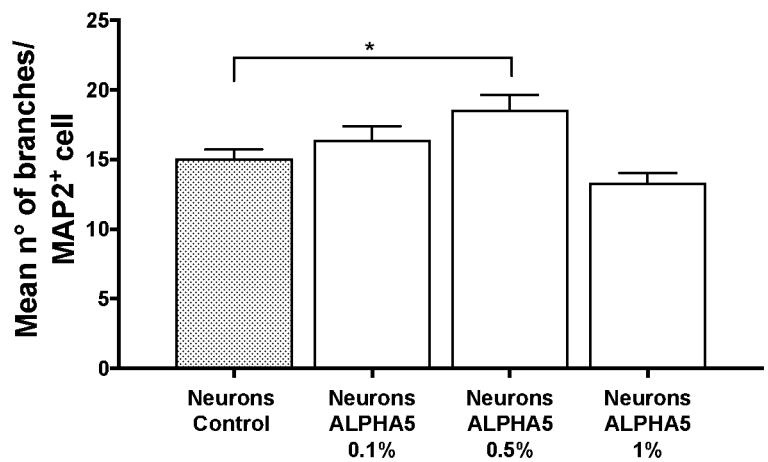
FIG. 3 shows a pattern of neuronal maturation of differentiating NSCs in vitro supplemented with a composition according to embodiments of the instant disclosure. The graphs in A and B show quantitative analysis of MAP2$^+$ Neurons at 10 DIV in control, ALPHAS 0.1%, ALPHAS 0.5% and ALPHAS 1% conditions. Data are presented as mean±SEM. *=$p<0.05$; =$p<0.01$; *=$p<0.001$; ****=$p<0.0001$.
Figure 3:
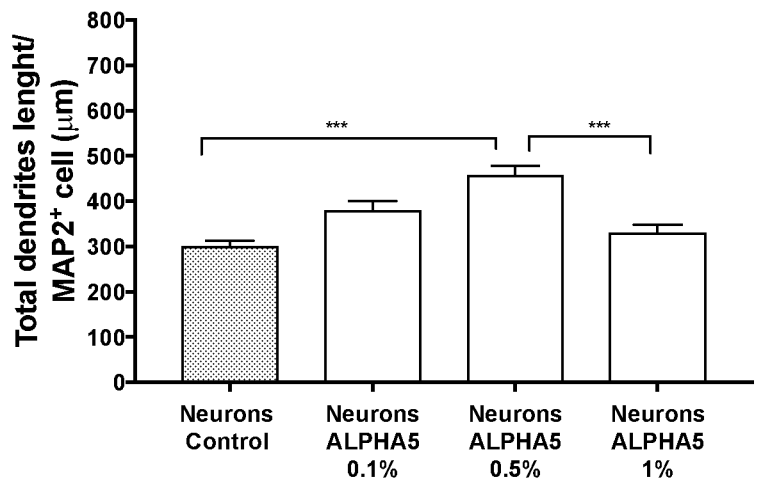
Figure 4:
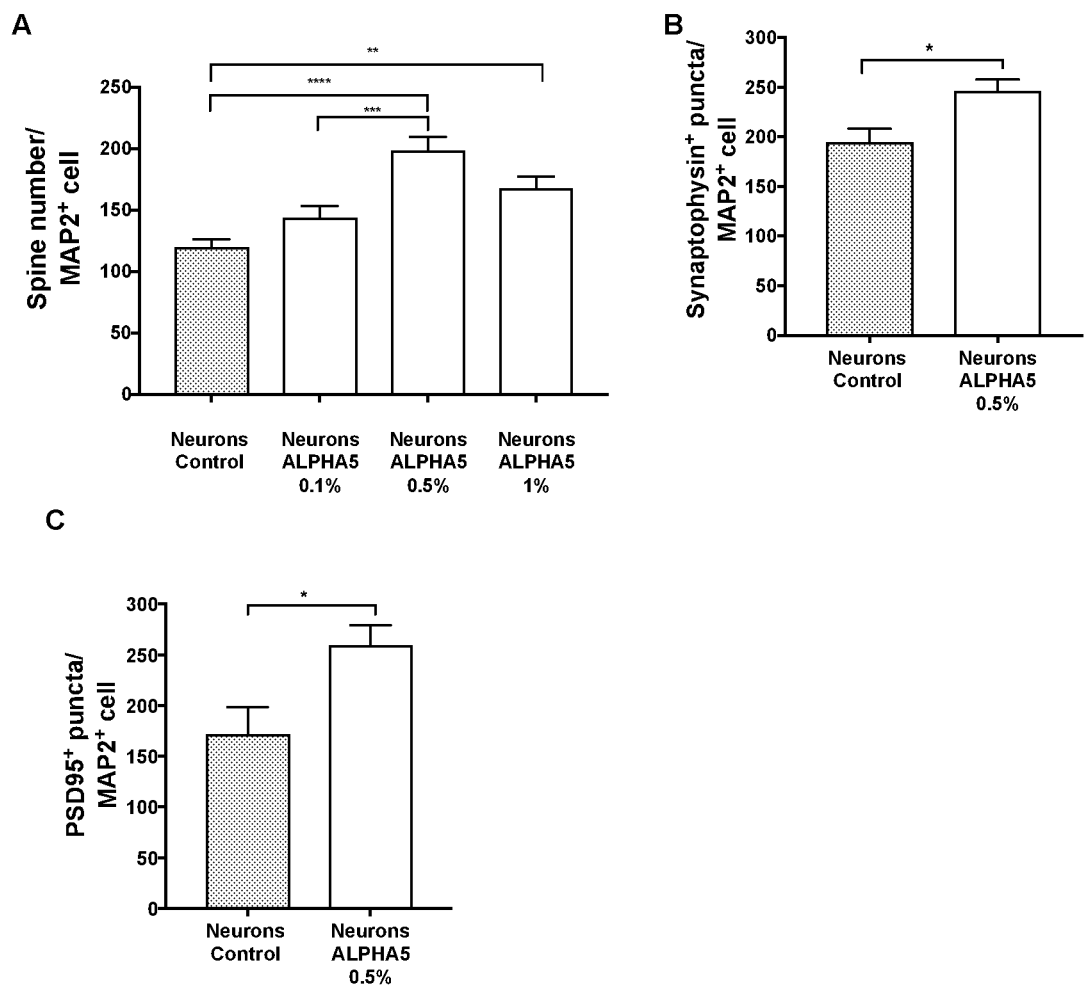
FIG. 4 shows the dendritic spine maturation and excitatory synaptic markers expression in differentiating NSCs in vitro supplemented with a composition according to embodiments of the instant disclosure. Data are presented as mean±SEM. *=$p<0.05$; =$p<0.01$; *=$p<0.001$; ****=$p<0.0001$.

While α5m supplementation did not change the percentage of MAP2$^+$ differentiating cells, a significant increase in the mature neuronal morphology, including dendritic branching and dendritic spines were observed (FIG. 3 and FIG. 4).

When analysing the morphology of the ramified MAP2$^+$ cells, a statistical increase of the mean number of branches was observed (i.e., the MAP2$^+$ segment comprised between two junction points)/cell in 0.5%-supplemented men-Neurons (from 15.07 to 18.55 branches, FIG. 3A), and a similar trend was observed also in 0.5%-supplemented SVZ-Neurons (from 15.27 to 17.07 branches).

The increase in mean number of branches was in line with the statistical increase of the total dendritic length, in both populations, when supplemented with the α5m composition (men-Neurons: 301.6 to 458.6 μm FIG. 3B; SVZ-Neurons: 225.5 to 285.2 μm). These data suggest an increase in the cell complexity after α5m supplementation, and an increased coverage of dendrites.

In order to further characterize the increase in neuronal maturation in α5m supplemented neurons, the dendritic spine number and density for each experimental condition using ImageJ software was evaluated. The dendritic spine number progressively increases in 0.5% supplemented neurons (men-Neurons: from 119.6 to 198.2 spines/MAP2+ neuron FIG. 4A; SVZ-Neurons 109.2 to 152.0 spines/MAP2+ neuron). The specific spine morphology was analysed by using the Neuron Studio software (Rodriguez et al., 2008). Dendritic spines of mature neurons modify the morphology from elongated thin spine to more stable stubby and mushroom spines.

In men-Neurons an increase in stubby spines was observed at 0.1% and 0.5% concentration of α5m composition (from 36.15% to 48.62% and 47.56%, respectively) and in SVZ-Neurons an increase in the fraction of mushroom spines at 0.1% and 0.5% (from 22.81% to 28.58% and 29.03%, respectively).

These data suggest that dendritic spines in both men-Neurons and SVZ-Neurons supplemented with the α5m composition acquire a stable morphology (i.e. stubby and mushroom, respectively) confirming the effect of α5m supplementation in enhancing neuronal maturation.

To confirm the maturation of the differentiating neurons, the presence of synapses was assessed by analysing the expression of the pre- and post-synaptic excitatory markers Synaptophysin and PSD95, in control and in α5m-supplemented neurons using ImageJ software (Dzyubenko et al., 2016).

The number of Synaptophysin immunoreactive puncta (FIG. 4B), as well as the number of PSD95 immunoreactive puncta (FIG. 4C), increased in supplemented neurons compared to control.

These results confirm the increased maturation in α5m supplemented neurons compared to the control, as they show more branches, more mature spines and more synaptic markers, due to an enhancement of the oxidative metabolism in differentiating neurons.

In Vivo Analysis

Adult female C57BL/6J mice were exposed to laminectomy and the contusive injury was performed at vertebrate thoracic level 11 (T11). The procedure of severe SCI, due to the severity of the performed surgeries or to complication during the recovery period caused the death of 1 animal out of 50.

Supplementation of the α5m composition (3 g/day in the drinking water) was administered three days post SCI (3 dpi). This therapeutic approach starts approximately at the end of the sub-acute phase of SCI pathogenesis. The supplementation was maintained for 31 days. Locomotors recovery and tissue histology of treated and control animals were compared.

Locomotor Evaluation

In order to evaluate the effects of the α5m supplementation on the motor functional recovery after a severe SCI, the Basso Mouse Scale (BMS) analysis was performed. The locomotor performance of each mouse was assessed at 1, 3, 5, 7 dpi during the first week after the SCI surgery and twice a week (10, 14, 17, 21, 28, 31 dpi) till the end of the experiment (31 dpi), when mice were perfused and spinal cords were dissected. Only mice that show a BMS score of "0" at 1 dpi were included in the analysis; mice with higher BMS score were excluded from the study.

Figure 6:
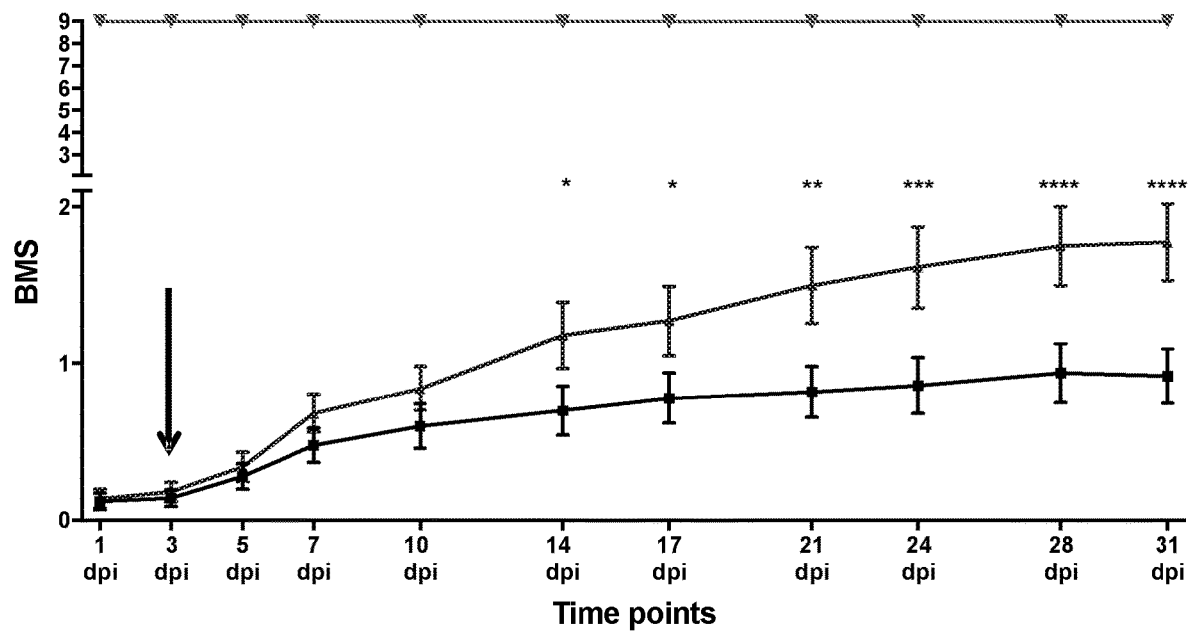
FIG. 6 shows the result of the locomotor functional recovery analysis in control- and treated-animals after severe SCI. The graph represents the BMS score of composition-treated (line with triangles) and control (line with squares) after severe SCI. The arrow indicates the starting day of the composition administration (3 dpi). Injured mice received the supplementation in sterile water (n=22 among 3 experiments) or only sterile water (control mice; n=25 among 3 experiments). Data are shown as mean±SEM. *p<0.05, P<0.01, *p<0.001, ****p<0.0001. BMS=basso mouse scale; dpi=day post injury.

The graph of FIG. 6 represents the BMS score of α5m composition treated (line above with triangles) and control (line below with squares) after severe SCI. The arrow indicates the starting day of α5m composition administration (3 dpi). Injured mice received α5m composition in sterile water (n=22 among 3 experiments) or only sterile water (n=25 among 3 experiments).

The BMS of treated mice gradually and significantly increase compared with control SCI mice over the 28 days of administration.

At 31 dpi treated mice reached a mean BMS score of 1.773±0.2434 while the control group reached a mean BMS score of 0.92±1.772 (differences between experimental conditions were analysed with 2 way ANOVA test and post-hoc Tukey post-test).

Therefore, mice treated with α5m composition showed significant improvement in locomotor recovery compared to control mice. As showed in FIG. 6, Post-hoc analysis revealed significant group differences in the BMS score at 14, 17, 21, 24, 28, 31 dpi.

Ankle Movement Analysis

'Spasticity' is understood to be a common symptom resulting from an injury (Adam and Hick, 2005) and it is a major cause of disability in individuals affected by a variety of central nervous system diseases (such as multiple sclerosis, stroke, and cerebral palsy) and trauma (including SCI and brain injury).

Figure 7:
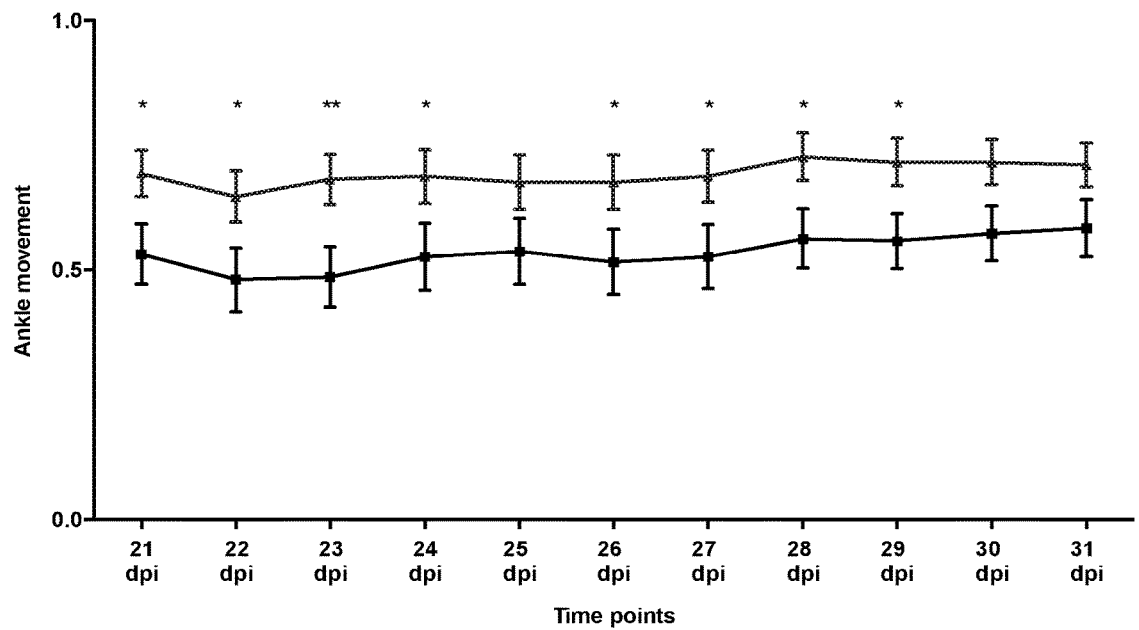
FIG. 7 shows a graph representing the ankle movement score in control- (line with squares) and treated-mice (line with triangles) after sever SCI. Data are shown as mean±SEM. **P<0.01, *P<0.05. BMS=basso mouse scale; dpi=day post injury.

In order to determine if the supplementation with the α5m composition has an effect in avoiding the instauration of a spastic condition of the muscles, the degree of movement of the ankle joint was evaluated. The spasticity of each treated and control mouse was assessed daily starting from 21 dpi till the end of the experiment (31 dpi), FIG. 7.

The ankle joint flexibility of treated animals show a significant improvement compared to the control one. At 31 dpi, the ankle movement exhibited by treated animals was 0.6888±0.0455, while for the control was 0.5939±0.0651 (differences between experimental conditions were analysed with 2 way ANOVA test and post-hoc Tukey post test).

Mice treated with α5m composition therefore showed a significantly higher ankle movement compared to control mice from 21 dpi until 29 dpi indicating a faster recovery from muscles spasticity after injury.

Bladder Functionality Evaluation

Figure 8:
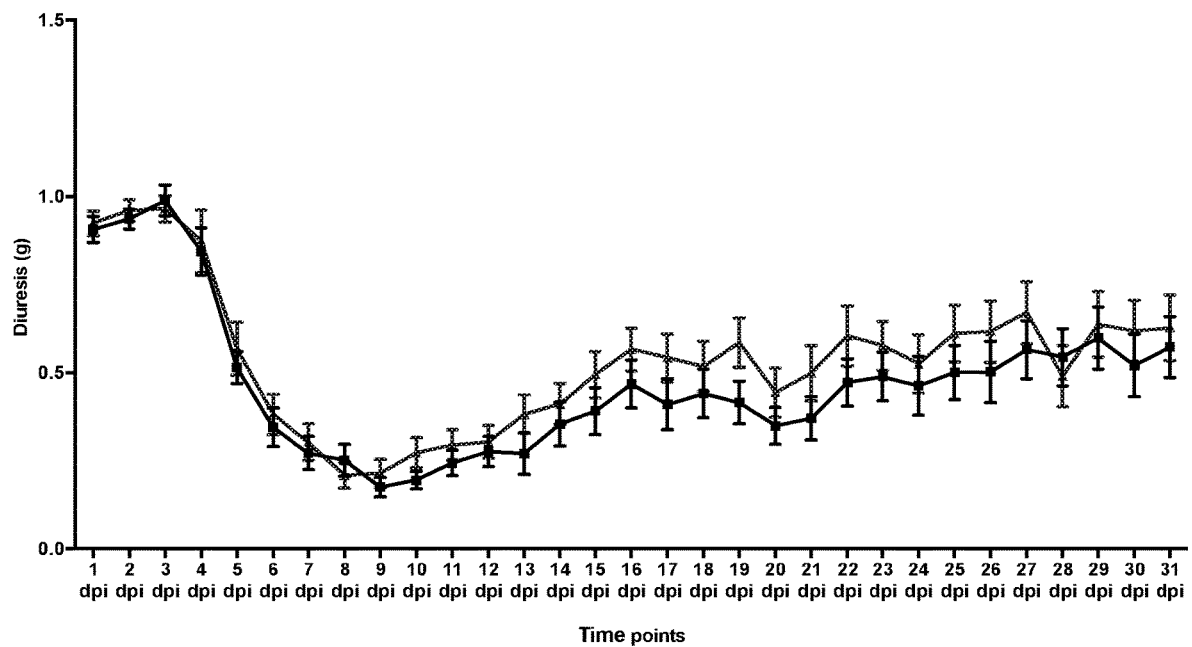
FIG. 8 shows a graph representing the daily diuresis of control- (line with squares) and treated-mice (line with triangles) after severe SCI. Data are shown as mean±SEM; dpi=day post injury.

One of the most common effects after SCI is the dysfunction of the bladder activity. Following SCI the bladder, usually referred as neurogenic bladder, undergoes dramatic changes that result in a spastic bladder or a flaccid one (Taweel W. A et al., 2015). In order to investigate if, after severe SCI, the administration of α5m composition could exert a beneficial role in the recovery of the bladder functionality, the daily diuresis of α5m composition treated and control mice was analysed.

α5m composition treated and control animals during the experiment showed a similar daily diuresis (FIG. 8). At 31 dpi treated group showed a mean daily diuresis of 0.6359 g±0.1073 g while control group of 0.5889 g±0.1145 g thus providing the evidence of the effect of the α5m composition in the recovery of the functionality of the bladder after injury.

Tissue Histology

Traumatic insults to the spinal cord lead to mechanical damage and subsequent tissue degeneration. These events are associated with shearing of cell membranes and axons, disruption of the blood-spinal cord barrier, myelin degradation, immune cell transmigration and spinal cord cell death (Zhang et al., 2012). In order to investigate how α5m composition treatment contributes to the regeneration of the injured tissue, spinal cord parenchyma cystic (cyst) and glial scar formation, neuronal number, myelin content.

Cystic and Glial Scar Formation

After SCI the formation of a glial scar and a cystic formation (Hu R et al., 2010, Yi-Min Yuan and Cheng He, 2013) around the injury site contribute to limit the lesioned area. However, it inhibits the axonal regeneration after a SCI (Rooney G E et al., 2009) acting as a physical and molecular barrier (Fehlings M. G. and Tator C. H., 1999).

Considering the importance of the glial cell response to the injury, the Inventor of the instant application evaluated if the administration of the α5m composition had a role on the scar formation and astrocyte reaction. Immunofluorescence staining using the specific marker for astrocytes, Glial Fibrillary Acidic Protein (GFAP) was performed. Spinal cord transversal sections covering a parenchyma segment of 1.5 cm length (15 transversal spinal cord slices/animal) centered at the lesion site (lesion performed at T11 vertebra level) was observed.

Figure 9:
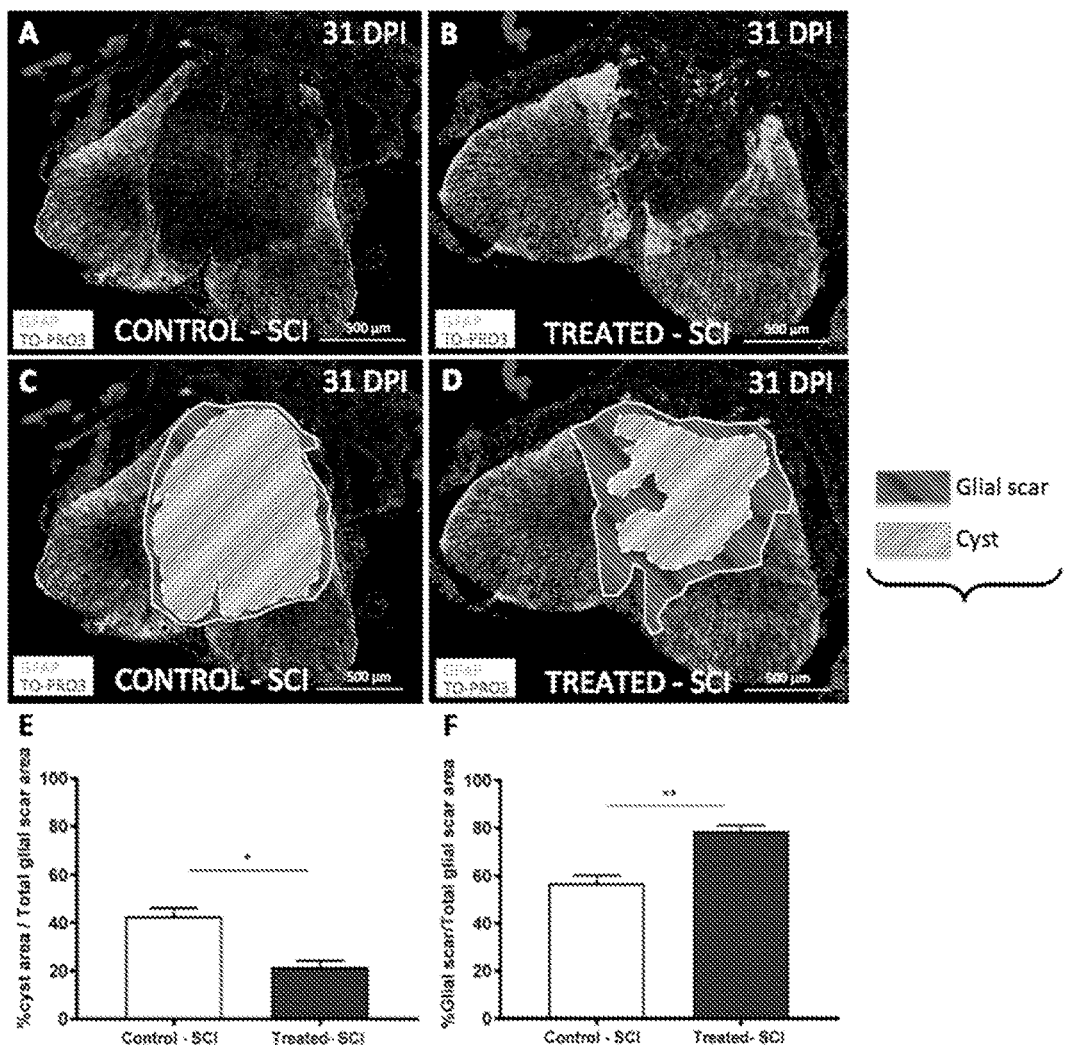
FIG. 9 represents transversal spinal cord immunostained slices showing glial scar reaction and Cyst area in control- and treated-mice after severe SCI. Transversal spinal cord slices immunostained with the specific astrocytic marker GFAP and TO-PRO3™ of a control- (A) and a treated-mouse (B) illustrating the regions considered for the quantifications. Transversal spinal cord slices immunostained with the specific astrocytic marker GFAP and TO-PRO3™ of a control- (C) and of a treated-mouse (D). The gray dashed area indicates the glial scar area. The white dashed area indicates the cyst area. White dashed area and grey dashed area (delineated with a white line) indicate the total lesion area. (E) Graph representing the percentage ratio of the cyst area on the total lesioned area in a control and a treated-mouse. (F) Graph representing the percentage ratio of the glial scar area on the total lesion area in control- and a treated-mouse. Quantitative data are expressed as means±SEM; *p<0.05; **p<0.01. n=3 animals and 8 slices/animal were analysed for each group. GFAP=Glial Fibrillary Acidic Protein.

FIG. 9 shows transversal spinal cord slices immunostained with the specific astrocytic marker GFAP and TO-PRO3' of a control (A, C) and a α5m composition treated mouse (B, D) illustrating the regions considered for the quantifications. The grey dashed area indicates the glial scar area. The white dashed area indicates the cystic (cyst) area. As shown in panel E, the administration of the composition herein disclosed led to a significant reduction of the cyst area (21.62±2.505%) compared to the control (42.94%±3.249). Panel F shows that, following the α5m administration, animals showed a significant larger glial scar area (78.81%±2.232%) compared to the control (57.06%±3.294%).

Figure 10:
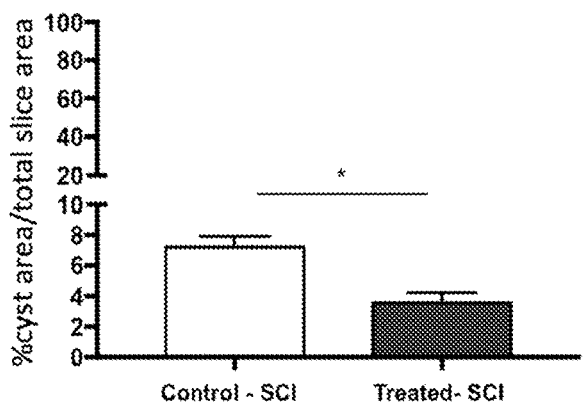
FIG. 10 shows a graph representing the percentage ratio of the glial scar area on the total slice area in control- and treated-mice after severe SCI. Quantitative data are expressed as means±SEM; *p<0.05. n=3 animals and 8 slices/animal were analysed for each group.

FIG. 10 shows a graph representing the percentage ratio of the glial scar area on the total slice area in control and α5m treated mouse. Following α5m treatment, animals showed a significant smaller cyst area (3.55%±0.6756%) compared to the control animals (7.2%±0.7068%).

These data highlight the high efficacy of the composition herein disclosed in counteracting neural tissue loss after injury.

Neuronal Content

The spinal cord tissue degeneration due to the first mechanical injury is followed by a secondary insult that determines further destruction of neuronal cells (Zhang N. et al., 2012).

In order to investigate the effects of the supplementation with the α5m composition on the neuronal content after a severe SCI, the Inventor assessed the number of neurons in spinal cord lesioned parenchyma by immunofluorescence staining with the specific neuronal marker NeuN. Spinal cord transversal sections were analysed, covering a parenchyma segment of 1.5 cm length (15 transversal spinal cord slices/animal) centered at the lesion site (lesion performed at T11 vertebra level).

First of all, the number of NeuN-positive cells in the whole spinal cord slice was evaluated. Strikingly, analysis showed that in the perilesioned area, in the α5m treated group more neurons were present (613.3±24.04) than in the control group (224.9±58.03) and the difference was statistically significant (FIG. 11).

The Inventor also evaluated if the difference in the neuronal content was maintained also in the ventral area of the spinal cord slices, where motor neurons are located. Also in this case, the number of NeuN-positive cells resulted significantly higher in the α5m treated group (255.8±12.35) compared to the control group (62.66±13.51). The difference was statistically significant thus providing the evidence of the effect of the compositions herein disclosed in the recovery of the neuronal content after injury.

Neurofilament Analysis

The major structural proteins in mature neuron axons are neurofilaments (NFs). Their expression is closely associated with axonal growth and maintenance of neuronal homeostasis (Wang H. et al., 2012). After SCI, the neuronal loss in gray matter is accompanied by a loss of neurofilament chain and myelin proteins (Qian J. et al., 2010).

Figure 12:
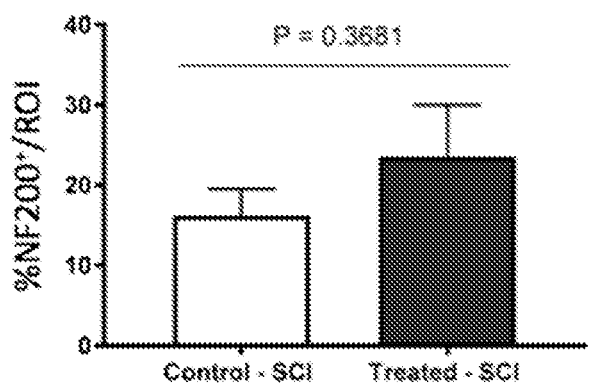
FIG. 12 shows a graph representing the percentage ratio of the area covered by Neurofilament-200 on the selected region of interest (ROI) in treated and control mouse. Quantitative data are expressed as means±SEM; SCI=spinal cord injury; n=3 animals and 8 slices/animals were analysed for each group.

In order to investigate the presence of axonal regrowth in α5m composition-treated SCI mice, the Inventor performed immunofluorescence staining using the specific marker for the neurofilament proteins, Neurofilament-200 (NF200). For the analysis, the Inventor considered spinal cord longitudinal sections covering a parenchyma area of 1.5 cm length (6 transversal spinal cord slices/animal) centered in the lesion site (lesion performed at T11 vertebra level). The graph shown in FIG. 12 represents the percentage ratio of the area covered by Neurofilament-200 on the selected region of interest (ROI) in α5m-treated and control mouse.

Treated group exhibits a trend of higher NF200 content (23.56±6.441%) compared to the control group (16.22±3.31%; FIG. 12).

These results show the capability of the α5m composition in favouring axonal regrowth after injury.

Re-Myelinating Potential

Demyelination constitutes a significant component of the SCI pathology and contributes to loss of function (Waxman S G et al., 1989). To assess the remyelinating potential of the supplementation with the α5m composition on mice after a severe SCI, Luxol Fast Blue (LFB) staining was performed. LFB allows the identification of the myelin content in the spinal cord parenchyma (blue area), from the demyelinated area (white area), as shown in FIG. 13. The analysis was carried out on spinal cord transversal sections covering a parenchyma segment of 1.5 cm length (15 transversal spinal cord slices/animal) centred at the lesion site (lesion performed at T11 vertebra level). The graph of FIG. 13 represents the percentage of the myelin content in the dorsal column of the spinal cord sections of α5m-treated (39.64%±0.3677) and control (38.47%±0.8927), calculated as myelin positive pixels in the dorsal column among the pixels of the total area of the dorsal column. At 31 dpi animals that received the supplementation with α5m presented a similar myelin content to control animals thus providing the evidence of the α5m composition remyelinating potential after severe SCI.

The results provided in the instant disclosure show that the amino-acid compositions herein disclosed, comprising a combination of leucine, isoleucine, valine, threonine, lysine, with citric acid, succinic acid, and malic acid, is able to enhance the oxidative metabolism in differentiating neurons, favouring axonal regrowth after injury, and counteract neural tissue loss in a SCI animal model.

From the foregoing, it emerges clearly how the compositions according to the instant disclosure are useful for the treatment of central nervous system injuries in a subject, wherein the injuries are preferably selected in the group consisting of cerebral injury, spinal cord injury, peripheral nerve injury, a demyelinating disease.

REFERENCES

Adams, M. M., and Hicks, A. L. (2005). Spasticity after spinal cord injury. Spinal Cord 43, 577-586.

Basso, D. M., Fisher, L. C., Anderson, A. J., Jakeman, L. B., McTigue, D. M., Popovich, P G. (2006) Basso Mouse Scale for locomotion detects differences in recovery after spinal cord injury in five common mouse strains. J Neurotrauma. 23(5), 635-659.

Bifari, F., Decimo, I., Chiamulera, C., Bersan, E., Malpeli, G., Johansson, J., Lisi, V., Bonetti, B., Fumagalli, G., Pizzolo, G., et al. (2009). Novel stem/progenitor cells with neuronal differentiation potential reside in the leptomeningeal niche. J. Cell. Mol. Med. 13, 3195-3208.

Bifari, F., Decimo, I., Pino, A., Llorens-Bobadilla, E., Zhao, S., Lange, C., Panuccio, G., Boeckx, B., Thienpont, B., Vinckier, S., et al. (2017). Neurogenic Radial Glia-like Cells in Meninges Migrate and Differentiate into Functionally Integrated Neurons in the Neonatal Cortex. Cell Stem Cell 20

Dzyubenko E, Rozenberg A, Hermann D M, Faissner A. et al. (2016). Colocalization of synapse marker proteins evaluated by STED-microscopy reveals patterns of neuronal synapse distribution in vitro. J Neurosci Methods. 273, 149-159.

Hu, R., Zhou, J., Luo, C., Lin, J., Wang, X., Li, X., Bian, X., Li, Y., Wan, Q., Yu, Y., et al. (2010). Glial scar and neuroregeneration: histological, functional, and magnetic resonance imaging analysis in chronic spinal cord injury. J. Neurosurg. Spine 13, 169-180.

Qian, J., Herrera, J. J., and Narayana, P. A. (2010). Neuronal and axonal degeneration in experimental spinal cord injury: in vivo proton magnetic resonance spectroscopy and histology. J. Neurotrauma 27, 599-610.

Rodriguez, A., Ehlenberger, D. B., Dickstein, D. L., Hof, P. R., and Wearne, S. L. (2008). Automated Three-Dimensional Detection and Shape Classification of Dendritic Spines from Fluorescence Microscopy Images. PLoS One 3, e1997

Rooney, G. E., Endo, T., Ameenuddin, S., Chen, B., Vaishya, S., Gross, L., Schiefer, T. K., Currier, B. L., Spinner, R. J., Yaszemski, M. J., et al. (2009). Importance of the vasculature in cyst formation after spinal cord injury. J. Neurosurg. Spine 11, 432-437.

Tator, C. H., and Fehlings, M. G. (1999). Review of clinical trials of neuroprotection in acute spinal cord injury. Neurosurg. Focus 6, e8.

Taweel, W. A., and Seyam, R. (2015). Neurogenic bladder in spinal cord injury patients. Res. Rep. Urol. 7, 85-99.

Wang, H., Wu, M., Zhan, C., Ma, E., Yang, M., Yang, X., and Li, Y. (2012). Neurofilament proteins in axonal regeneration and neurodegenerative diseases. Neural Regen. Res. 7, 620-626.

Waxman, S. G., Black, J. A., Kocsis, J. D., and Ritchie, J. M. (1989). Low density of sodium channels supports action potential conduction in axons of neonatal rat optic nerve. Proc. Natl. Acad. Sci. U.S.A 86, 1406-1410.

Yuan, Y.-M., and He, C. (2013). The glial scar in spinal cord injury and repair. Neurosci. Bull. 29, 421-435.

Zhang, N., Yin, Y., Xu, S.-J., Wu, Y.-P., and Chen, W.-S. (2012). Inflammation & apoptosis in spinal cord injury. Indian J. Med. Res. 135, 287-296.

Zheng, X., Boyer, L., Jin, M., Mertens, J., Kim, Y., Ma, L., Ma, L., Hamm, M., Gage, F. H., and Hunter, T. (2016). Metabolic reprogramming during neuronal differentiation from aerobic glycolysis to neuronal oxidative phosphorylation. Elife 5.

The invention claimed is:

1. Method of treating a central nervous system injury comprising administering to a subject in need thereof a therapeutically effective amount of an active agent containing the amino acids leucine, isoleucine, valine, threonine, and lysine, and the carboxylic acids citric acid, succinic acid, and malic acid.

2. The method of claim 1, wherein the weight ratio between the overall amount of citric acid, malic acid, and succinic acid, and the overall amount of leucine, isoleucine, valine, lysine, and threonine is comprised between 0.05 and 0.3.

3. The method of claim 1, wherein the weight ratio between the overall amount of citric acid, malic acid, and succinic acid, and the overall amount of leucine, isoleucine, and valine is comprised between 0.1 and 0.4.

4. The method of claim 1, wherein the weight ratio between citric acid and the sum of malic acid and succinic acid is comprised between 1.0 and 4.0.

5. The method of claim 1, wherein the citric acid:malic acid:succinic acid weight ratio is comprised between 10:1:1 and 2:1.5:1.5.

6. The method of according to claim 1, wherein said active agent further comprises at least one amino acid selected from the group consisting of histidine, phenylalanine, methionine, tryptophan, tyrosine, and cysteine.

7. The method of claim 1, wherein said active agent further comprises histidine, phenylalanine, methionine, tryptophan, cysteine, and optionally tyrosine.

8. The method of claim 1, wherein the ratio between the overall molar amount of citric acid, malic acid, and succinic acid, and the overall molar amount of methionine, phenylalanine, histidine, and tryptophan is higher than 1.35.

9. The method of claim 1, wherein the ratio between the overall molar amount of the three carboxylic acids citric acid, succinic acid, and malic acid, and the overall molar amount of lysine and threonine is comprised between 0.10 and 0.70.

10. The method of claim 1, wherein the weight or molar amount of citric acid is higher than the overall weight or molar amount of both malic acid and succinic acid.

11. The method of claim 1, wherein the weight ratio between leucine and citric acid is comprised between 5 and 1.

12. The method of claim 1, wherein the composition further comprises one or more vitamins.

13. The method of claim 1, wherein the central nervous system injury is selected from the group consisting of cerebral injury, spinal cord injury, peripheral nerve injury, and a demyelinating disease.

14. The method of claim 13, wherein the spinal cord injury comprises contusive spinal cord injury.

15. The method of claim 2, wherein the weight ratio between the overall amount of citric acid, malic acid, and succinic acid, and the overall amount of leucine, isoleucine, valine, lysine, and threonine is comprised between 0.1 and 0.25.

16. The method of claim 3, wherein the weight ratio between the overall amount of citric acid, malic acid, and succinic acid, and the overall amount of leucine, isoleucine, and valine is comprised between 0.15 and 0.35.

17. The method of claim 4, wherein the weight ratio between citric acid and the sum of malic acid and succinic acid is comprised between 1.5 and 2.5.

18. The method of claim 5, wherein the citric acid:malic acid:succinic acid weight ratio is comprised between 7:1:1 and 1.5:1:1.

19. The method of claim 12, wherein the wherein the one or more vitamins comprise vitamins B.

20. The method of claim 12, wherein the one or more vitamins comprise vitamin B1 and/or vitamin B6.

* * * * *